S. S. CHILDS.
SPRING WHEEL.
APPLICATION FILED SEPT. 28, 1906.
907,459.  Patented Dec. 22, 1908.
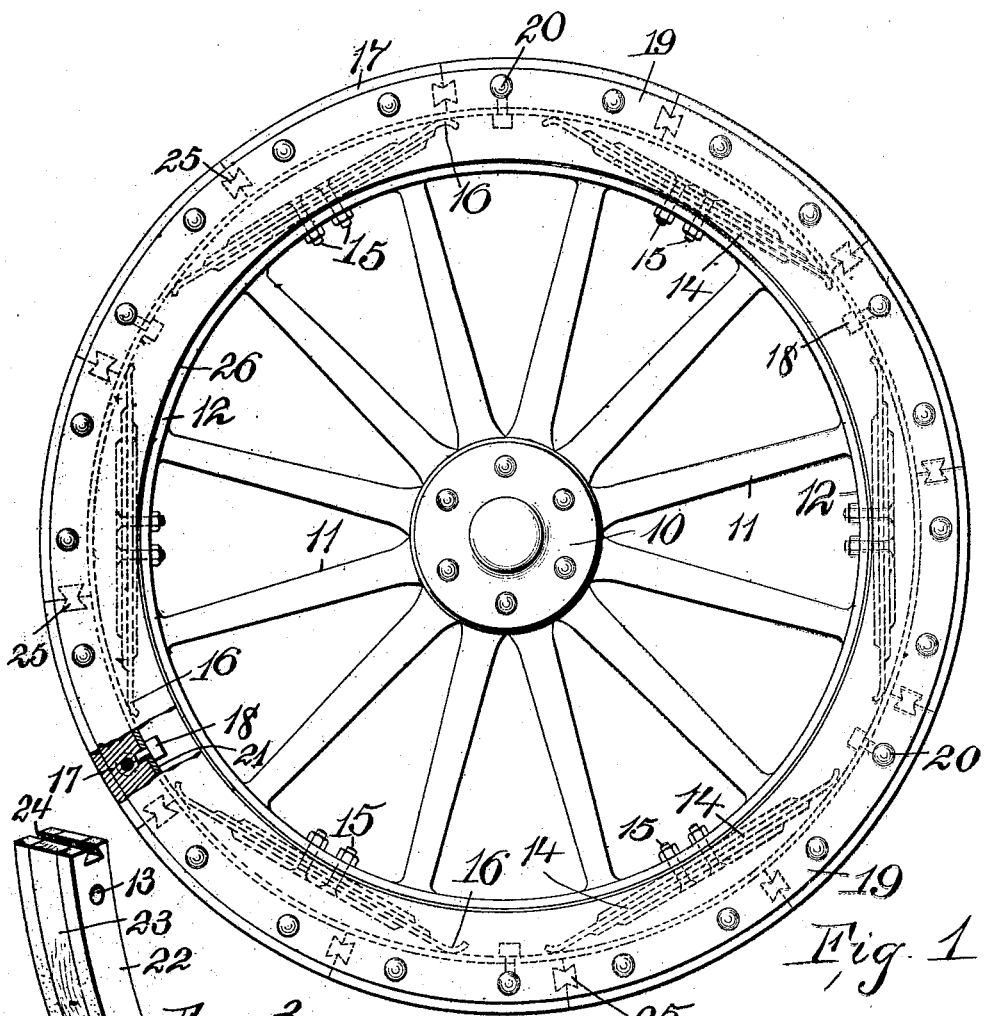
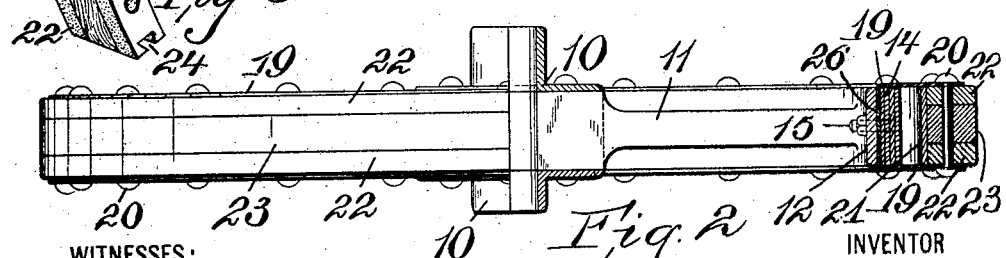
WITNESSES:
Ralph Lancaster
E. A. Pell
INVENTOR
Samuel S. Childs
BY
Wm. H. Canfield.
ATTORNEYS

UNITED STATES PATENT OFFICE.

SAMUEL S. CHILDS, OF BERNARDSVILLE, NEW JERSEY.

SPRING-WHEEL.

No. 907,459.  Specification of Letters Patent.  Patented Dec. 22, 1908.

Application filed September 28, 1906. Serial No. 336,534.

*To all whom it may concern:*

Be it known that I, SAMUEL S. CHILDS, a citizen of the United States, residing at Bernardsville, in the county of Morris and State of New Jersey, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention provides a spring wheel that is of a solid construction, and provides a spring attachment that makes an easy riding vehicle, when the vehicle is attached thereto.

The invention consists in a wheel having a solid felly and having a rim arranged thereon, the felly being provided with a series of leaf springs arranged at a tangent to the felly, and having the ends bearing on the inner surface of the rim.

The invention further provides for a rim made of sections which permit the replacing of a damaged section by a new one without much trouble, and also provides a wheel having a rim that is formed of layers of material so that there is a slight amount of cushioning effect in the tire itself. This rim may, however, be of regular bent wood or other material, receiving a solid rubber tire.

The invention is illustrated in the accompanying drawings, in which—

Figure 1 is a side view of a wheel of my new construction. Fig. 2 is partly a top view and partly a horizontal section of the improved wheel, and Fig. 3 is a perspective view of one of the tire sections.

I provide the usual form of hub 10, with the spokes 11 and the felly 12. Attached to the outside rim, or the periphery of the felly 12, is a series of leaf springs 14, each spring being preferably made up of a multiplicity of leaves and secured intermediate of their ends, preferably at the center, to the felly by means of the bolts 15. The extremities or outer ends of the leaf springs are in sliding contact with the inner surface of the rim 17 Between the adjacent ends of adjoining springs are arranged the blocks 18 to allow a limited movement of the springs so that the blocks can take up and transmit power, when the wheel is being used as a driver. On either side of the wheel is a covering and guide plate 19, which is secured to the rim 17 by means of the bolts 20. This plate serves to guide the wheel in its spring action, keep grit and foreign substances from the springs and wearing parts, and to cover that portion of the wheel. The ends 16 of the springs 14, at their extremities, bear on a ring 21 arranged on the inside of the rim, this ring being preferably of steel or a hard metal. This structure makes up a resilient wheel that is not liable to breakage, is adapted for heavy loads, and makes a reasonably cheap construction.

I prefer to make the tire portion of the rim, of segments, as shown in Fig. 3, these segments being made up of three layers, the outside layers, or edges, being composed of leather, or rubber, or similar resilient material, and the inner strip 23, of each section or segment, being made up of wood, preferably. With the perforations 13, in this rim, sections are penetrated by the bolts 20, and the sections are thus held in place, and each section has, on its end, a dove-tail groove 24, the shape of which can be changed, and these grooves receive a key 25 which locks two adjoining sections together. In this way a tire rim is built that is solid, and that, when a portion of it is injured, can be replaced by sections or a section without destroying the whole tire rim.

The outer edge of the felly 12 is preferably provided with a layer 26 of leather, or like substance, that makes a tight joint with the plates 19 to more effectually shut out the dirt and grit that might enter, and to also take up all rubbing so that the wheel will not creak. The springs, in this wheel, might be bolted to the rim and have their inner ends in contact with the felly. An equivalent can also be supplied for the blocks 18. If desired, one end 16, of one of the springs 14, can be bolted or fastened securely to the rim.

Having thus described my invention, what I claim is:—

In a wheel, a rim formed of curved segments having transverse recesses in their abutting faces and widened on the inside, keys to fit each pair of recesses to lock the segments to form the rim and extending to the edges of the segments, and side plates to lock the keys in position.

In testimony, that I claim the foregoing, I have hereunto set my hand this twenty-six day of September 1906.

SAMUEL S. CHILDS.

Witnesses:
 GUS A. MEYER,
 WM. H. CAMFIELD.